United States Patent
Yakobson

(10) Patent No.: US 6,809,123 B2
(45) Date of Patent: Oct. 26, 2004

(54) PRODUCTION OF HYDROGEN AND HIGHER HYDROCARBONS

(75) Inventor: Dennis L. Yakobson, Arvada, CO (US)

(73) Assignee: Rentech, Inc., Denver, CO (US)

( * ) Notice: Subject to any disclaimer, the term of this patent is extended or adjusted under 35 U.S.C. 154(b) by 76 days.

(21) Appl. No.: 10/213,896

(22) Filed: Aug. 7, 2002

(65) Prior Publication Data

US 2004/0029983 A1 Feb. 12, 2004

(51) Int. Cl.$^7$ .............................................. C07C 27/00
(52) U.S. Cl. ....................... 518/721; 518/713; 518/715; 518/717; 518/719; 518/726
(58) Field of Search .................... 518/715, 717, 518/713, 719, 721, 726

(56) References Cited

U.S. PATENT DOCUMENTS

| | | | |
|---|---|---|---|
| 2,257,293 A | 9/1941 | Dreyfus | |
| 2,497,964 A | 2/1950 | Sumerford | |
| 2,579,663 A | 12/1951 | Gilbert et al. | |
| 2,786,863 A | 3/1957 | Kolbel et al. | |
| 3,544,291 A | 12/1970 | Schlinger et al. | |
| 4,011,058 A | 3/1977 | Johnson et al. | |
| 4,022,591 A | 5/1977 | Staudinger | |
| 5,504,118 A | 4/1996 | Benham et al. | |
| 5,714,657 A | 2/1998 | deVries | |
| 6,068,760 A | 5/2000 | Benham et al. | |
| 6,277,894 B1 * | 8/2001 | Agee et al. | 518/700 |
| 6,416,568 B1 | 7/2002 | Wallace et al. | |

FOREIGN PATENT DOCUMENTS

| | | |
|---|---|---|
| EP | 0 035 328 A1 | 9/1981 |
| EP | 0 077 437 A1 | 4/1983 |
| FR | 2 396 068 | 3/1978 |

OTHER PUBLICATIONS

Fifth European Gasification Conference, Authors: Luke F. O'Keefe et al., Title: A Single IGCC Design for Variable CO2 Capture, Apr. 2002, 19 pages.

Chemical Engineering Institue, Technical University, Authors: Herbert Kolbel and Milos Ralek. Title: The Fischer–Tropsch Synthesis in the Liquid Phase, undated, copyright 1980, Berlin, Germany, 26 pages.

International Search Report for International application PCT/US03/24866 (7 pages); Applicant Rentech, Inc.

* cited by examiner

Primary Examiner—J. Parsa
(74) Attorney, Agent, or Firm—Patent Law Offices of Rick Martin, P.C.

(57) ABSTRACT

A carbon-bearing feedstock is reacted with oxygen and water in a partial oxidation reactor to produce a mixture of hydrogen and carbon monoxide. The hydrogen is removed as a first product and the remaining carbon monoxide is reacted with steam over a bifunctional catalyst to produce higher hydrocarbons and carbon dioxide. The bifunctional catalyst provides water gas shift and Fischer-Tropsch functions.

42 Claims, 1 Drawing Sheet

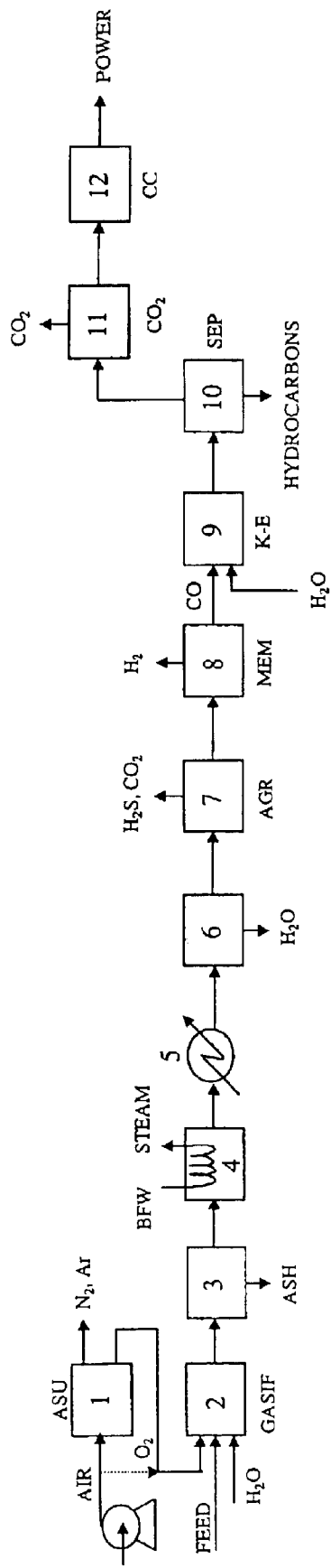
FIGURE 1. COPRODUCTION OF HYDROGEN, HYDROCARBONS AND CARBON DIOXIDE

PRODUCTION OF HYDROGEN AND HIGHER HYDROCARBONS

FIELD OF THE INVENTION

This invention relates to the production and recovery of hydrogen from partial oxidation of carbon-bearing feedstocks and the reaction of carbon monoxide from the partial oxidation reactor with steam in a slurry reactor containing an iron-based catalyst to produce higher hydrocarbons and carbon dioxide.

BACKGROUND OF THE INVENTION

The emergence of fuel cells as a non-polluting means for producing electrical power on a large scale and the need to reduce the sulfur and aromatic content of gasoline and Diesel fuel have increased the demand for hydrogen. The conventional method for producing hydrogen is steam reforming of natural gas. Carbon monoxide formed along with the hydrogen can be reacted with steam to produce additional hydrogen and carbon dioxide (water gas shift reaction). Other feedstocks such as coal, petroleum coke, and heavy oil from oil refinery operations when reacted with water or steam and oxygen produce a mixture of hydrogen, carbon monoxide and carbon dioxide. The water gas shift reaction can be used to produce more hydrogen from the carbon monoxide. Therefore, in order to maximize hydrogen production in the aforementioned processes, wherein the water gas shift reaction is employed, the carbon in the feedstock is contained in carbon dioxide which can be sequestered, sold as a product or vented to the atmosphere. Concern over the potential contribution of atmospheric carbon dioxide to global warming has created the need to minimize production and venting of carbon dioxide. This invention reduces the amount of carbon dioxide produced by replacing the water gas shift reactor with a Kolbel-Engelhardt (K-E) reactor to produce valuable hydrocarbon products.

The Kolbel-Engelhardt reaction uses steam instead of hydrogen to react with carbon monoxide over a dual function catalyst to produce primarily hydrocarbons having at least five carbon atoms and carbon dioxide. The K-E reaction is best carried out in a three-phase bubble column reactor containing an iron-based powdered catalyst suspended in wax. This technique is an improvement over the aforementioned conventional technology wherein the carbon monoxide is reacted with water in a shift reactor to produce hydrogen and carbon dioxide. (See "A Single IGCC Design for Variable $CO_2$ Capture", by Luke F. O'Keefe et al, Fifth European Gasification Conference, April 2002). It can be appreciated by those skilled in the art, that in the conventional technology all of the carbon is removed in carbon dioxide, whereas in the instant case a portion of the carbon is removed in the hydrocarbons produced in the K-E reactor.

DESCRIPTION OF THE PRIOR ART

H. Dreyfus in U.S. Pat. No. 2,257,293 teaches a method of manufacturing hydrocarbons using a reactor comprising two zones. The first zone is used to carry out the water gas shift reaction to produce hydrogen and carbon dioxide and the second zone is used to carry out the Fischer-Tropsch reaction between hydrogen and carbon monoxide In U.S. Pat. No. 2,497,964 Sumerford teaches a method for adding steam to a fluidized-bed Fischer-Tropsch reactor to minimize carbon formation. In U.S. Pat. No. 2,579,663 Gilbert and Montgomery teach a method of reacting steam and carbon monoxide to produce normally liquid hydrocarbons. In U.S. Pat. No. 2,786,863 Kolbel and Engelhardt teach a method for producing oxygen-containing compounds using a mixture of steam, carbon monoxide and methanol.

The reaction between water and carbon monoxide to produce hydrocarbons using a powdered iron-based Fischer-Tropsch catalyst in a slurry reactor was reported by Kolbel and Ralek in "The Fischer-Tropsch Synthesis in the Liquid Phase", Catal. Rev.-Sci. Eng., 21(2), 258 (1980). This reaction was referred to as the Kolbel-Engelhardt (K-E) reaction.

Louis deVries, (U.S. Pat. No. 5,714,657), describes a process comprising partial oxidation (POX) of natural gas followed by a reaction between hydrogen and carbon dioxide (reverse water gas shift) to produce water and carbon monoxide. The water and carbon monoxide are reacted in a K-E reactor to produce normally liquid hydrocarbons. Hydrogen and carbon dioxide from the K-E reactor are recycled back to the reverse water gas shift reactor via the POX reactor to produce additional carbon monoxide and water. In U.S. Pat. No. 6,416,568 Wallace et al teach a method for recovering and purifying a high pressure stream of hydrogen separated from synthesis gas using a membrane. Gases not permeating through the membrane containing carbon monoxide are used as fuel in a gas turbine/generator set to produce electrical power.

SUMMARY OF THE INVENTION

Hydrogen, liquid hydrocarbons and carbon dioxide are produced from feedstocks such as natural gas, coal, petroleum coke, or oil refinery bottoms. A feedstock is reacted with oxygen and water (and/or steam) to produce a mixture of hydrogen and carbon monoxide in a partial oxidation reactor (POX). Partial oxidation technologies developed by Texaco, Shell, Lurgi and others are suitable for use with this invention. For example, POX reactors described in U.S. Pat. No. 3,544,291 by W. G. Schlinger et al and in U.S. Pat. No. 4,022,591 by Gernot Staudinger can be used. The oxygen can be essentially pure as obtained from an air separation unit or diluted with nitrogen and argon as in air. Air separation can be carried out using either cryogenic or pressure swing adsorption systems, both of which are available commercially. The hot gases leaving the POX unit-are mainly hydrogen, carbon monoxide, carbon dioxide and water and are cooled either by water quench or in a waste heat boiler. Typically if the feedstock is natural gas or other feedstock having little or no ash, a waste heat boiler can be used. Sulfur compounds and carbon dioxide are removed by conventional technologies using chilled methanol, hot potassium carbonate, or amine systems. Hydrogen, the first product, is removed from the remaining carbon dioxide and carbon monoxide using a membrane or other separation means such as pressure swing adsorption. The carbon monoxide is reacted with steam over a dual-function catalyst to produce liquid hydrocarbons and carbon dioxide (the Kolbel-Engelhardt reaction). The bi-functional catalyst must possess activity for the water gas shift reaction and for the Fischer-Tropsch (FT) reaction since the hydrogen for the FT reaction comes from the water gas shift reaction.

The diameter of the catalyst particles should be between 1 and 150$\mu$ for best results. Catalyst prepared in accordance with U.S. Pat. No. 5,504,118 by Benham et al is suitable for this application and is incorporated herein by reference. Alternatively, the catalyst prepared according to U.S. Pat. No. 5,504,118 can be strengthened by addition of a bonding agent.

The K-E reactor can be operated within a temperature range of 450 to 550° F., more preferably between 460 and 520° F. and most preferably between 480 and 500° F. The K-E reactor can be operated at pressures in the range of 150–500 psia, more preferably between 200 and 400 psia, and most preferably between 300 and 375 psia. The K-E reactor can be operated at a space velocity in the range of 2–10 normal liters (Nl) of combined steam and CO per hour per gram of catalyst, more preferably between 2.5 and 7.5 Nl of steam and CO per hour per gram of catalyst, and most preferably between 3.0 and 5.0 Nl steam and CO per hour per gram of catalyst. The superficial velocity of the gases fed to the K-E reactor should be in the range of 2 to 20 cm/s, more preferably between 5 and 15 cm/s and most preferably between 8 and 12 cm/s. The superficial velocity is defined as the velocity that the combined gases fed to the K-E reactor would have in an empty reactor at the temperature and pressure of the gases at the inlet to the reactor. The volumetric ratio of steam to carbon monoxide flow rates should be between 0.5 and 2, more preferably between 0.75 and 1.5, and most preferably between 0.9 and 1.1.

In order to maintain the slurry level in the K-E reactor constant and to keep the catalyst inventory in the reactor constant, a catalyst/wax separation device must be employed. The catalyst/wax separation device described in co-assigned U.S. Pat. No. 6,068,760 to Benham et al is suitable for use in this invention and is incorporated herein by reference.

The partial oxidation reaction, can be expressed as:

$$CH_z + 0.50\ O_2 \to z/2 H_2 + CO \qquad (1)$$

where z is the H:C ratio of the feedstock.
The water gas shift reaction also takes place:

$$H_2O + CO \to H_2 + CO_2 \qquad (2)$$

Where x represents the number of moles of water (or steam) reacted per mole of carbon in the feedstock, then equations 1 and 2 can be combined to give:

$$CH_z + 0.5\ O_2 + xH_2O \to (x+z/2)H_2 + (1-x)CO + xCO_2 \qquad (3)$$
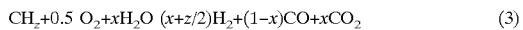

The desired $H_2$:CO ratio exiting the gasifier dictates the amount of water (or steam) reacted with the feedstock. For example, if r represents the desired $H_2$:CO ratio, then $$x = (r - z/2)/(1 + r) \qquad (4)$$

The number of moles of water exiting the gasifier is determined by the equilibrium constant for the water gas shift reaction 2. If K designates the equilibrium constant, then the number of moles of water exiting the gasifier per mole of carbon gasified is:

$$N_{H2O} = [(x+z/2)x]/[K(1-x)] \qquad (5)$$

The Kolbel-Engelhardt reaction requires the water gas shift reaction (Eq. 2 above) to provide the $H_2$ for the Fischer-Tropsch reaction:

$$2H_2 + CO \to CH_2 + H_2O \qquad (6)$$

Combining equations 2 and 6 gives:

$$uH_2O + CO \to (1-u)/2 CH_2 + (1+u)/2 CO_2 + (3u-1)/2 H_2 \qquad (7)$$

where u is the $H_2O$:CO usage ratio which has a value of ⅓ for the case where no $H_2$ is fed to the K-E reactor and no net $H_2$ is produced.

DESCRIPTION OF THE PROCESS

A block diagram of the process is shown in FIG. 1. Referring to FIG. 1, air fed to separation unit 1 produces two streams—oxygen having a purity of about 95% and a stream comprised primarily of nitrogen and argon. Alternatively, compressed air can be used without separation. The preheated oxygen or air, water (and/or steam) and a feedstock, e.g., petroleum coke, coal or heavy oil are fed to a partial oxidation reactor 2 which produces a stream composed of (primarily) hydrogen, carbon monoxide, carbon dioxide, water vapor, methane, ash and sulphur compounds. The ash is removed in separator 3 and the gases are cooled either by a direct water quench or by a waste heat boiler 4. The gases are further cooled in exchangers 5 and condensed water is removed in separator 6. Carbon dioxide and sulphur compounds are removed in acid gas removal unit 7, and hydrogen is removed in hydrogen removal unit 8. The gas remaining after hydrogen removal is primarily carbon monoxide which is fed along with steam to the K-E reactor 9. Products of the K-E reaction are separated in the product recovery unit 10. Tail gases from the product recovery unit contain a large percentage of carbon dioxide which can be removed in optional $CO_2$ removal unit 11. The remaining tail gases can then be used as fuel for a gas turbine in a combined cycle electrical power plant 12, or for other plant fuel requirements. Carbon dioxide removed in units 7 and 11 can be sold as product or sequestered depending upon circumstances.

Note: Calculations were performed using proprietary in-house computer programs developed by Rentech (assignee of this invention) personnel to determine quantities of hydrogen and liquid hydrocarbons obtainable using the process of FIG. 1.

EXAMPLE 1

One thousand tons of petroleum coke is mixed with water to form a slurry containing 62% by weight solids. The slurry is fed to a partial oxidation reactor along with 1002 tons of oxygen of 95% purity. The gases leaving the reactor at 2445° F. and at a pressure of 400 psia have the following composition

| | |
|---|---|
| $H_2$ | 28.7 MMSCF |
| CO | 45.9 |
| $CO_2$ | 8.7 |
| $CH_4$ | 0.2 |
| $H_2O$ | 10.1 |
| $N_2$ + Ar | 1.7 |
| $H_2S$ | 1.3 |

After $H_2S$ and $H_2O$ removal, 90% of the $H_2$ (25.8 MMSCF) is removed as product. The remaining gases are fed to a K-E reactor operating at 325 psia and 500° F. along with 22.9 MMSCF of saturated steam at 400 psia. Products from the K-E reactor consist of 1728 Bbl of $C_5$+ hydrocarbons and 39.0 MMSCF of $CO_2$. In this case, 69.9% of the carbon in the feedstock is removed in captured $CO_2$ and 23.0% of the carbon is removed in the $C_5$+ hydrocarbons.

In the conventional art wherein a shift reactor is used in place of the K-E reactor, 69.9 MMSCF of $H_2$ and 51.0 MMSCF of $CO_2$ would be produced. In this case, 91.3% of the carbon would be removed in captured $CO_2$.

EXAMPLE 2

One thousand tons of Pittsburgh No.8 coal is mixed with water to form a slurry which contains 64% by weight solids.

The slurry is fed to a partial oxidation reactor along with 878 tons of oxygen of 95% purity. The gases leaving the reactor at 2387° F. and at a pressure of 400 psia have the following composition

| | |
|---|---|
| $H_2$ | 28.8 MMSCF |
| CO | 36.6 |
| $CO_2$ | 9.2 |
| $CH_4$ | 0.04 |
| $H_2O$ | 13.5 |
| $N_2$ + Ar | 1.4 |
| $H_2S$ | 0.8 |

After $H_2S$ and $H_2O$ removal, 90% of the $H_2$ (25.9 MMSCF) is removed as product. The remaining gases are fed to a K-E reactor operating at 325 psia and 500° F. along with 18.3 MMSCF of saturated steam at 400 psia. Products from the K-E reactor consist of 1380 Bbl of $C_5$+hydrocarbons and 31.8 MMSCF of $CO_2$. In this case, 67.9% of the carbon in the feedstock is removed in captured $CO_2$ and 21.9% of the carbon is removed in the $C_5$+ hydrocarbons.

In the conventional art wherein a shift reactor is used in place of the K-E reactor, 61.5 MMSCF of $H_2$ and 42.9 MMSCF of $CO_2$ would be produced. In this case, 91.5% of the carbon would be removed in captured $CO_2$.

EXAMPLE 3

One thousand tons of H-oil from a refinery is fed to a partial oxidation reactor along with 988 tons of oxygen of 95% purity and 257 tons of steam. The gases leaving the reactor at 2400° F. and at a pressure of 450 psia have the following composition

| | |
|---|---|
| $H_2$ | 37.4 MMSCF |
| CO | 49.2 |
| $CO_2$ | 2.2 |
| $CH_4$ | 0.7 |
| $H_2O$ | 4.0 |
| $N_2$ + Ar | 1.5 |
| $H_2S$ | 1.3 |

After $H_2S$ and $H_2O$ removal, 90% of the $H_2$ (33.7 MMSCF) is removed as product. The remaining gases are fed to a K-E reactor operating at 375 psia and 500° F. along with 24.6 MMSCF of saturated steam at 400 psia. Products from the K-E reactor consist of 1854 Bbl of $C_5$+ hydrocarbons and 33.0 MMSCF of $CO_2$. In this case, 62.1% of the carbon in the feedstock is removed in captured $CO_2$ and 25.9% of the carbon is removed in the $C_5$+ hydrocarbons.

In the conventional art wherein a shift reactor is used in place of the K-E reactor, 81.4 MMSCF of $H_2$ and 47.9 MMSCF of $CO_2$ would be produced. In this case, 90.1% of the carbon would be removed in recovered $CO_2$.

EXAMPLE 4

One thousand tons of petroleum coke from a refinery is mixed with 729 tons of water to form a slurry and fed to a partial oxidation reactor along with 5746 tons of air. The gas leaving the reactor at 2445° F. and at a pressure of 400 psia has the following composition

| | |
|---|---|
| $H_2$ | 22.8 MMSCF |
| CO | 36.5 |
| $CO_2$ | 18.3 |
| $CH_4$ | 0.01 |
| $H_2O$ | 21.2 |
| $N_2$ + Ar | 119.8 |
| $H_2S$ | 1.3 |

After $H_2S$ and $H_2O$ removal, 90% of the $H_2$ (20.5 MMSCF) is removed as product. The remaining gases are fed to a K-E reactor operating at 300 psia and 500° F. along with 18.2 MMSCF of saturated steam at 400 psia. Products from the K-E reactor consist of 1375 Bbl of $C_5$+hydrocarbons and 39.8 MMSCF of $CO_2$. In this case, 71.2% of the carbon in the feedstock is removed in captured $CO_2$ and 18.3% of the carbon is removed in the $C_5$+ hydrocarbons.

In the conventional art wherein a shift reactor is used in place of the K-E reactor, 55.7 MMSCF of $H_2$ and 51.3 MMSCF of $CO_2$ would be produced. In this case, 91.7% of the carbon would be removed in recovered $CO_2$.

EXAMPLE 5

Thirty million standard cubic feet of methane are fed to a partial oxidation reactor along with 731 tons of 98% pure oxygen. The gas leaving the reactor at 2100° F. and at a pressure of 400 psia has the following composition

| | |
|---|---|
| $H_2$ | 53.4 MMSCF |
| CO | 28.0 |
| $CO_2$ | 1.0 |
| $CH_4$ | 1.1 |
| $H_2O$ | 4.5 |
| $N_2$ + Ar | 0.1 |

After $H_2O$ removal, 90% of the $H_2$ (48.1 MMSCF) is removed as product. The remaining gases are fed to a K-E reactor operating at 375 psia and 500° F. along with 14.0 MMSCF of saturated steam at 400 psia. Products from the K-E reactor consist of 1054 Bbl of $C_5$+hydrocarbons and 19.5 MMSCF of $CO_2$. In this case, 65.0% of the carbon in the feedstock is removed in captured $CO_2$ and 26.2% of the carbon is removed in the $C_5$+ hydrocarbons.

In the conventional art wherein a shift reactor is used in place of the K-E reactor, 76.8 MMSCF of $H_2$ and 27.0 MMSCF of $CO_2$ would be produced. In this case, 90.0% of the carbon would be removed in recovered $CO_2$.

I claim:
1. In a process for producing and recovering hydrogen and hydrocarbons from carbon-bearing feedstocks comprising:
   a) first reacting the feedstocks with oxygen or compressed air and water or steam in a partial oxidation reactor;
   b) recovering hydrogen and carbon dioxide from gases exiting said partial oxidation reactor;
   c) reacting carbon monoxide exiting the partial oxidation reactor with steam in a Kolbel-Engelhardt reactor to produce hydrocarbons and carbon dioxide; and
   d) recovering the hydrocarbons and carbon dioxide produced in the Kolbel-Engelhardt reactor.
2. The process of claim 1, wherein the feedstock is coal.
3. The process of claim 2, wherein the coal is fed to the partial oxidation reactor in a water slurry.
4. The process of claim 1, wherein the feedstock is petroleum coke.

5. The process of claim 4, wherein the petroleum coke is fed to the partial oxidation reactor in a water slurry.

6. The process of claim 1, wherein the feedstock is residual oil from an oil refinery.

7. The process of claim 6, wherein the water added in conjunction with residual oil is saturated steam at a gasifier operating pressure.

8. The process of claim 1, wherein the feedstock is natural gas.

9. The process of claim 1, wherein the $H_2$:CO ratio of a gas exiting the partial oxidation reactor is between about 0.5 and about 2.5.

10. The process of claim 1, wherein the recovered hydrogen is separated from the partial oxidation reactor gas effluent by using a membrane that is selectively permeable to hydrogen.

11. The process of claim 1, wherein the recovered hydrogen is separated from the partial oxidation reactor gas effluent by using pressure swing absorption.

12. The process of claim 1, wherein the Kolbel-Engelhardt reactor is a three-phase slurry bubble column reactor.

13. The process of claim 12, wherein the Kolbel-Engelhardt reactor uses a precipitated iron catalyst.

14. The process of claim 13, wherein the catalyst contains potassium.

15. The process of claim 14, wherein the ratio of potassium to iron on a weight basis is between about 0.005 and about 0.015.

16. The process of claim 13, wherein the catalyst contains copper.

17. The process of claim 16 wherein the ratio of copper to iron on a weight basis is between about 0.005 and about 0.020.

18. The process of claim 13, wherein the catalyst is spray dried.

19. The process of claim 17, wherein said catalyst has a particle diameter between about 1 and about 150 microns.

20. The process of claim 13, wherein the catalyst contains a compound useful for increasing attrition resistance.

21. The process of claim 12, wherein the Kolbel-Engelhardt reactor is maintained at a temperature between about 450° F. and about 550° F.

22. The process of claim 12, wherein Kolbel-Engelhardt reactor is maintained at a pressure between about 150 and about 500 psia.

23. The process of claim 12, wherein the water fed to the Kolbel-Engelhardt reactor is saturated steam at the operating pressure of the reactor.

24. The process of claim 22, wherein the Kolbel-Engelhardt reactor has a molar ratio of saturated steam to carbon monoxide between about 0.5 and about 1.5.

25. The process of claim 12, wherein, the Kolbel-Engelhardt reactor is operated at a space velocity in the range of about 2 to about 10 normal liters of combined steam and carbon monoxide per hour per gram of catalyst.

26. The process of claim 12, wherein the superficial velocity of the gases fed to the Kolbel-Engelhardt reactor is between about 2 and about 20 cm/s.

27. The process of claim 14, wherein the ratio of potassium to iron on a weight basis is more preferably between about 0.0075 and about 0.012.

28. The process of claim 14, wherein the ratio of potassium to iron on a weight basis is most preferably between about 0.008 and about 0.010.

29. The process of claim 16, wherein the ratio of copper to iron on a weight basis is more preferably between about 0.0075 and about 0.015.

30. The process of claim 16, wherein the ratio of copper to iron on a weight basis is most preferably between about 0.009 and about 0.012.

31. The process of claim 17, wherein said catalyst more preferably has a particle diameter between about 10 and about 100 microns.

32. The process of claim 17, wherein said catalyst most preferably has a particle diameter between about 20 and about 80 microns.

33. The process of claim 12, wherein the Kolbel-Engelhardt reactor is more preferably maintained at a temperature between about 460° F. and about 520° F.

34. The process of claim 12, wherein the Kolbel-Engelhardt reactor is most preferably maintained at a temperature between about 480° F. and about 500° F.

35. The process of claim 12, wherein the Kolbel-Engelhardt reactor is more preferably maintained at a pressure between about 200 and about 450 psia.

36. The process of claim 12, wherein the Kolbel-Engelhardt reactor is most preferably maintained at a pressure between about 300 and about 400 psia.

37. The process of claim 22, wherein the Kolbel-Engelhardt reactor has a molar ratio of saturated steam to carbon monoxide more preferably between about 0.75 and about 1.2.

38. The process of claim 22, wherein the Kolbel-Engelhardt reactor has a molar ratio of saturated steam to carbon monoxide most preferably between about 0.9 and about 1.1.

39. The process of claim 12, wherein the Kolbel-Engelhardt reactor is operated at a space velocity more preferably in the range of about 2.5 to about 7.5 normal liters of combined steam and carbon monoxide per hour per gram of catalyst.

40. The process of claim 12, wherein the Kolbel-Engelhardt reactor is operated at a space velocity most preferably in the range of about 3.0 to about 5.0 normal liters of combined steam and carbon monoxide per hour per gram of catalyst.

41. The process of claim 12, wherein the superficial velocity of the gases fed to the Kolbel-Engelhardt reactor is more preferably between about 5 and about 15 cm/s.

42. The process of claim 12, wherein the superficial velocity of the gases fed to the Kolbel-Engelhardt reactor is most preferably between about 8 and about 12 cm/s.

\* \* \* \* \*